United States Patent [19]
Chin et al.

[11] Patent Number: 5,787,486
[45] Date of Patent: Jul. 28, 1998

[54] BUS PROTOCOL FOR LOCKED CYCLE CACHE HIT

[75] Inventors: Henry Chin, Wappingers Falls, N.Y.; John Edward Derrick, Milton, Vt.; Christopher Michael Herring, Longmont, Colo.; George Totolos, Jr., Wexford, Pa.

[73] Assignee: International Business Machines Corporation, Armonk, N.Y.

[21] Appl. No.: 572,987

[22] Filed: Dec. 15, 1995

[51] Int. Cl.$^6$ ............................................. G06F 12/14
[52] U.S. Cl. .................. 711/163; 711/113; 711/144; 711/145; 711/155; 711/152
[58] Field of Search .................. 395/288, 325, 395/472, 470, 478; 711/145, 143, 151, 163, 152, 155

[56] References Cited

U.S. PATENT DOCUMENTS

| | | | |
|---|---|---|---|
| 4,464,712 | 8/1984 | Fletcher | 395/449 |
| 4,513,367 | 4/1985 | Chan et al. | 395/472 |
| 4,972,338 | 11/1990 | Crawford et al. | 395/416 |
| 5,163,143 | 11/1992 | Culley et al. | 395/425 |
| 5,197,139 | 3/1993 | Emma et al. | 395/417 |
| 5,261,106 | 11/1993 | Lentz et al. | 395/726 |
| 5,269,020 | 12/1993 | Kakimoto | 395/600 |
| 5,276,847 | 1/1994 | Kohn | 395/490 |
| 5,293,491 | 3/1994 | Leung et al. | 395/848 |
| 5,325,535 | 6/1994 | Santeler et al. | 395/725 |
| 5,341,491 | 8/1994 | Ramanujan | 395/479 |
| 5,353,416 | 10/1994 | Olson | 395/325 |
| 5,452,463 | 9/1995 | Parks et al. | 395/726 |
| 5,471,590 | 11/1995 | Melo et al. | 395/288 |
| 5,485,592 | 1/1996 | Lau | 395/470 |
| 5,524,235 | 6/1996 | Larson et al. | 395/478 |

OTHER PUBLICATIONS

IBM Technical Disclosure Bulletin, vol. 35, No. 1A, Jun. 1992, "Dual-Bus Arbitration for Personal Computer Systems", pp. 343–347.

Intel Manual, Pentium Processor Family Developer's Manual, vol. 1: Pentium Processors, 1995, pp. 2–2, 2–3, 5–15, 5–16, 5–51, 6–19, 6–20, 6–22, 6–23, 6–24, 6–25; (Pentium registered TM).

*Primary Examiner*—Tod R. Swann
*Assistant Examiner*—Fred F. Tzeng
*Attorney, Agent, or Firm*—Shelley M. Beckstrand

[57] ABSTRACT

An apparatus and method are provided for maintaining lock characteristics while providing selective access to a cache during lock cycles. To guarantee that only one master accesses memory at a time, locked cycles are always passed to the internal arbitration unit of the memory controller, even if they are cache hits. If the local bus is not granted or cannot be guaranteed that it will be granted the bus for the locked cycle, the cycle is cancelled.

8 Claims, 3 Drawing Sheets

BUS PROTOCOL FOR LOCKED CYCLE CACHE HIT

BACKGROUND OF THE INVENTION

1. Technical Field of the Invention

This invention pertains to cache memories and semaphores. In particular, this invention provides access to cache during locked cycles while maintaining lock characteristics, thereby providing cycle time improvement over non-bufferable, non-cachable cycles.

2. Background Art

Locked cycles are used in computer systems for semaphore and other operations that only allow one master to access a particular memory location at a time. Thus, the system must guarantee that the locked cycle is the only cycle being performed at the time of it's execution in systems that do not perform address matching.

Regions of address space that locked cycles access are often cacheable, often they are in the cache, but the cache must treat such an access as a cache miss or otherwise let the memory controller provide the data ready strobes for cache. This complicates the design of caches and also degrades performance because the data ready strobes coming from the memory controller come later than those available from the cache.

Since many operations in modern operating systems depend on this type of operation and they are now non-cached cycles, or treated as if they are non-cached cycles, it is an important factor in system performance to optimize this operation.

Memory controllers service locked cycles by going to the target of the locked cycle while locking the internal arbitration unit. If the latest copy of the data accessed comes from the cache, the cache provides the data, but the control signals all come from the memory controller. This is a complex and slow protocol.

It is an object of the invention to provide access to cache during locked cycles while maintaining lock characteristics, thereby providing cycle time improvement over non-bufferable, non-cachable cycles.

SUMMARY OF THE INVENTION

In accordance with the invention, an apparatus and method are provided for maintaining lock characteristics while providing selective access to cache during lock cycles. Thus, to guarantee that only one master accesses memory at a time, locked cycles are always passed to the internal arbitration unit of the memory controller, even if they are cache hits. If the local bus is not granted or cannot be guaranteed that it will be granted the bus for the locked cycle, the cycle is cancelled.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
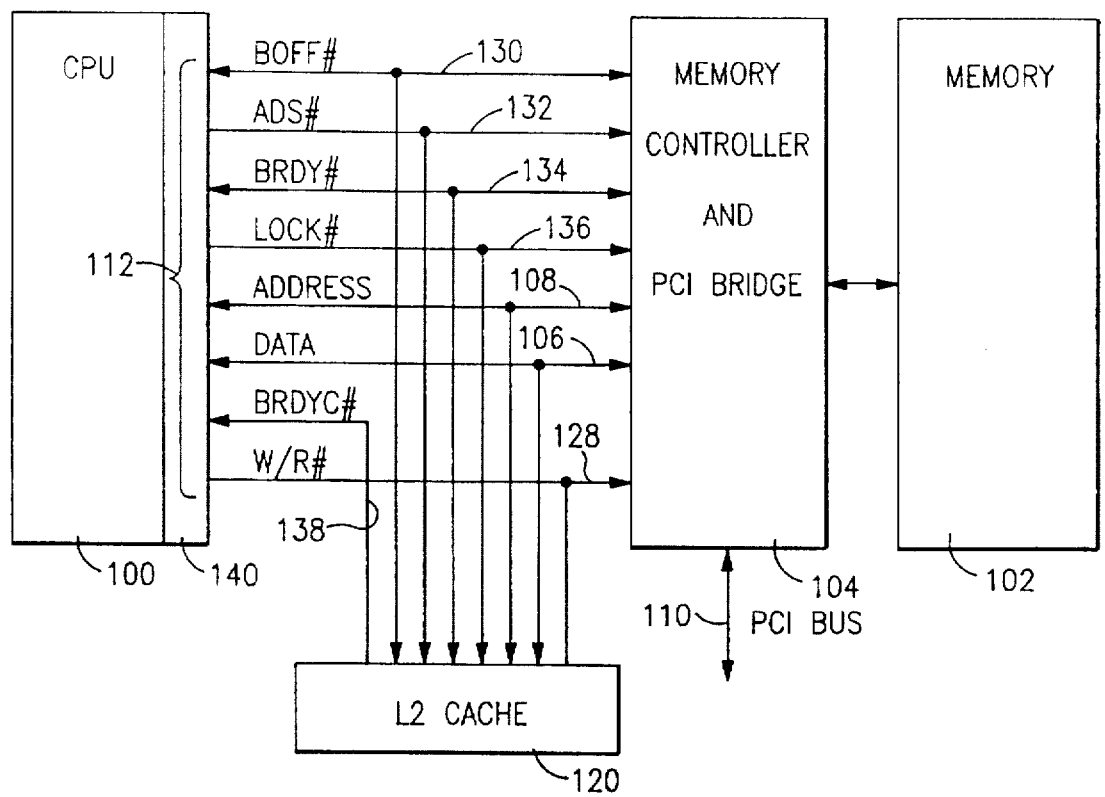
FIG. 1 is a schematic block diagram of the system of the invention.

A cache is high speed buffer storage that contains frequently or most recently accessed instructions and data; it is used to reduce access time. When the CPU does not find a data item it needs in the cache, a cache miss occurs, and the data is retrieved from main memory and put into the cache. This usually causes the CPU to pause until the data is available.

A cache hit occurs when the tag of a block checked in cache matches the cycle address. The resulting action for write cycles is to write through or write back. In write back, sometimes referred to as copy back or store in, when writing to cache, the information is written only to the block in cache. The modified cache block is written to main memory only when it (the block in cache) is replaced. In write through, sometimes referred to as store through, when writing to cache, the information is written to both the block in the cache and to the block in the lower-level memory. For read cycles, the cache immediately returns the data on cache hits. If the local bus is not granted or cannot be guaranteed that it will be granted the bus for the locked cycle, the cycle is cancelled using a back-off protocol, to be described hereafter in connection with the arbiter in the memory controller/PCI bridge. Otherwise, the system services the cycle like any other except that for cache miss writes the data ready strobe is returned after it is accepted by the target rather than when it is accepted by the write buffer.

A cache miss write, sometimes referred to as a write miss, occurs when no block tag checked within the cache matches the block-frame address from the CPU. The resulting actions generally are (1) to fetch on write (also referred to as write allocate), wherein the block is loaded, followed by write through or write back, or (2) to write around (also referred to as no write allocate), wherein the block is modified in the main store and not loaded into the cache.

In accordance with the present invention for controlling the operation of an L2 cache on a local bus, to guarantee that only one master accesses memory at a time, locked cycles are always passed to the internal arbitration unit of the memory controller, even if they are cache hits. The data and data ready strobe are provided by the memory controller if it is a read miss and by the cache if it is a read hit. If a write cycle is issued, it is treated like any other write-through cycle, the memory controller provides the data ready strobe and if it is a cache hit, the cache will update the data line but not the tag.

In accordance with the invention, lock read performance is identical to non-lock read performance, and lock write performance is provided similar improvement. This represents a major improvement over all lock cycles being treated as non-bufferable, non-cacheable cycles. Further, the time to service locked reads and writes is reduced while maintaining lock characteristics in multitasking operating systems such as, inter alia, IBM OS/2 2.X, IBM WORKPLACE OS, AIX, Microsoft Windows NT, and UNIX.

Referring to FIG. 1, in accordance with a preferred embodiment of the invention, central processing unit (CPU, or processor) 100 may be an Intel Pentium processor ("Pentium" is a registered trademark of Intel Corporation) as is more fully described in U.S. Pat. No. 4,972,338 and in *Pentium Processor Family Developer's Manual, Volume 1: Pentium Processors*, Order Number 241428, Intel Corporation, 1995. Intel Pentium processor 100 is of a type capable of retrying the whole of an exclusive access sequence. CPU 100 includes bus unit 140, which receives and drives data with respect to memory controller and PCI bridge 104 and L2 cache 120 on data bus 106, addresses on address bus 108, and control lines W/R# 128, BOFF# 130, ADS# 132, BRDY# 134, LOCK# 136 and BRDYC# 138, as will be more fully described hereafter. External bus, also referred to as local bus 112 includes address bus 108, data bus 106, and control lines including W/R# 128, BOFF# 130, ADS# 132, BRDY# 134, LOCK# 136, and BRDYC# 138. Several other control lines are included, though not shown, as of less pertinence to the present invention, a description of which may be found in the above identified descriptions of the Intel Pentium processor. Processor local bus 112 is of a type which does not support exclusive access to data interspersed with other data access.

Memory controller and PCI bridge 104 is connected to main memory 102 and PCI bus 110. A preferred embodiment of an L2 cache 120 is further described hereafter in connection with FIG. 2, and of the memory controller and PCI bridge 104 in connection with FIG. 3. Peripheral local bus, also referred to as PCI local bus, 110 is of the type capable of supporting exclusive access to data interspersed with other data accesses, such as is described in *PCI Local Bus Specification Revision* 2.1, Jun. 1, 1995, published by PCI Special Interest Group, P. O. Box 14070, Portland, Oreg. 97214, phone 1-800-433-5177, pages 73–80.

Address bus 108, as implemented in the Pentium architecture, is a 32-bit bus which provides address information to L2 cache 120 and memory controller and PCI bridge 104, as will be more fully explained hereafter.

Data bus 106, herein, is a 64-bit bus which, as implemented in Pentium architecture, provides burst read and burst writeback cycles and bus cycle pipe-lining, which allows two bus cycles to be in progress simultaneously.

Figure 5A:
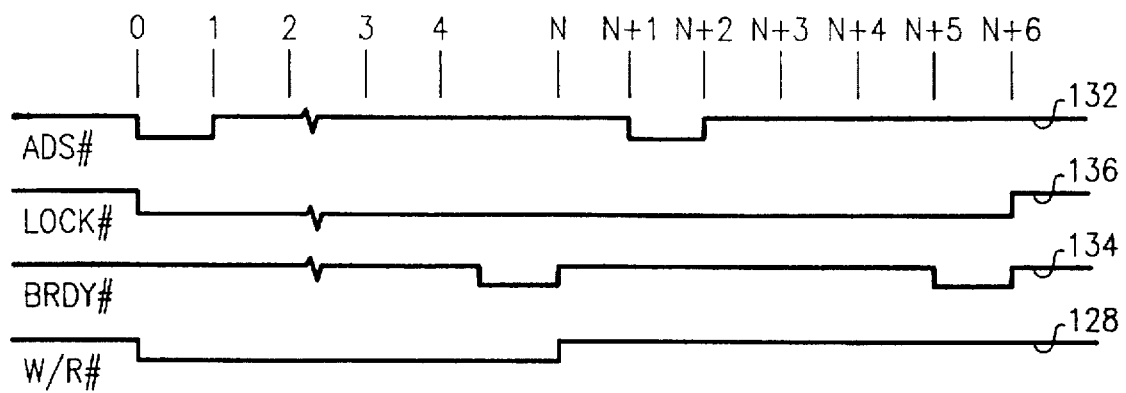
FIG. 5A is a timing diagram illustrating the prior art handling of lock cycles.
Figure 5B:
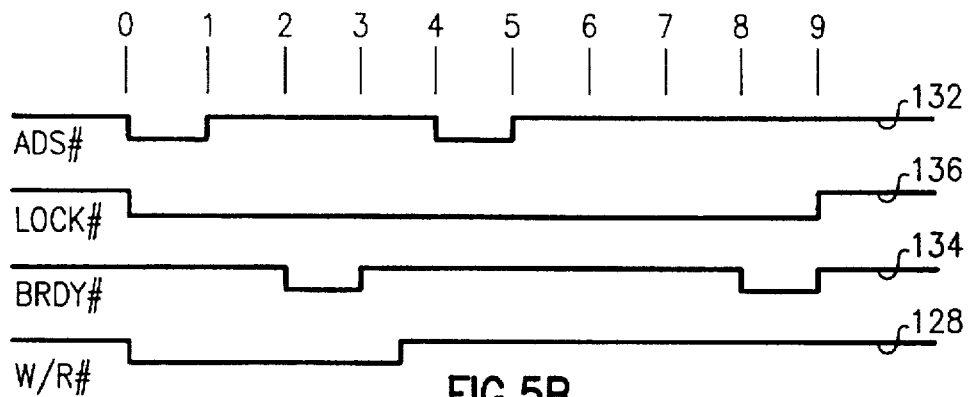
FIG. 5B is a timing diagram illustrating the method of the invention for handling lock cycles, illustrating the timing gains achieved over the prior art method of FIG. 5A.
Figure 6:
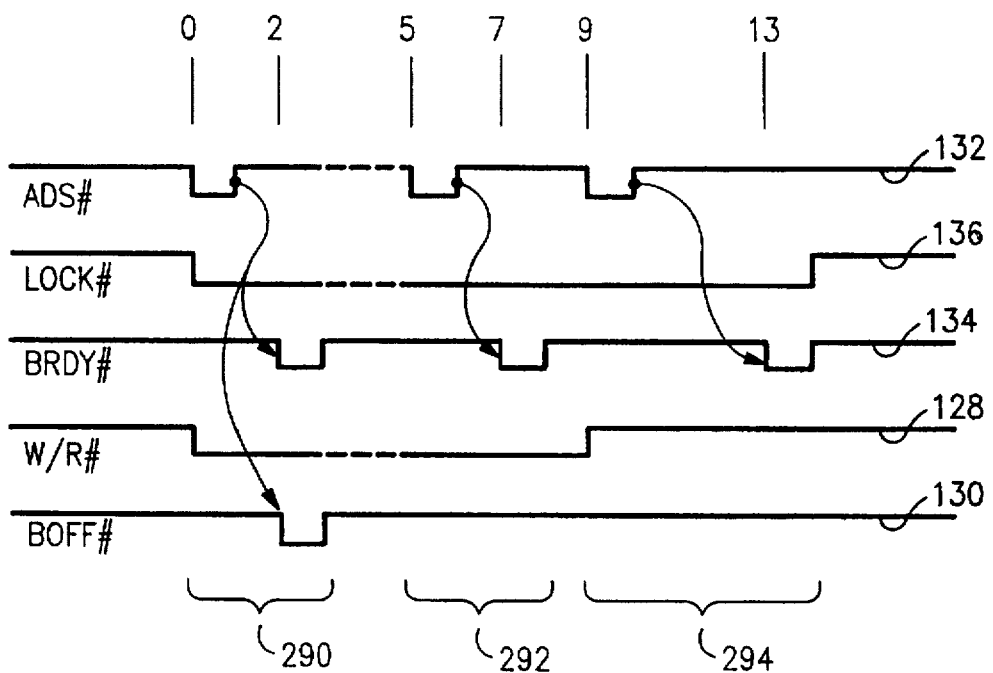
FIG. 6 is a timing diagram illustrating the method of the invention for executing aborted lock read operations, successful lock read access to cache, and successful locked write access to main memory and cache.

Referring further to FIG. 1, now in connection with FIGS. 5B and 6, Write/Read control line W/R# 128 distinguishes a read cycle from a write cycle. W/R# 128 is driven valid in the same clock as ADS# 132 and the cycle address. It remains valid from the clock in which ADS# 132 is asserted until the clock after the earlier of next address NA# (not shown) or the last BRDY# 134.

Backoff control line BOFF# 130, as implemented in Pentium architecture, is used to force processor 100 off bus 112 in the next clock cycle. That is, in response to BOFF# 130, processor 100 aborts all outstanding bus cycles that have not yet completed and floats processor bus 106 in the next clock. Processor 100 floats all pins normally floated during bus hold. Since the bus is floated in the clock after BOFF# 130 is asserted, an acknowledge is not necessary (that is, bus hold acknowledge signal HLDA, not shown, is not asserted in response to BOFF# 130). The processor remains in bus hold until BOFF# 130 is negated, at which time processor 100 restarts any aborted bus cycle(s) in their entirety by driving out the address on address bus 108 and status and asserting ADS# 132, as will be described hereafter. Any data with BRDY# 134 returned to the processor while BOFF# is asserted is ignored. BOFF# 130, as implemented in Pentium technology, has a higher priority than BRDY# 134. If both BOFF# 130 and BRDY# 134 occur in the same clock, BOFF# 130 takes effect. If BOFF# 130 and BUSCHK# are both asserted during a bus cycle, BOFF# 130 causes the BUSCHK# to be forgotten. BOFF# 130 is sampled by processor 100 bus unit 140 on every rising clock edge.

In a multi-master system, another bus master may require the use of bus 112 before allowing processor 100 to complete its current cycle. BOFF# line or pin 130 is provided to prevent this deadlock situation. If BOFF# 130 is asserted, processor 100 immediately (in the next clock) floats bus 112. Any bus cycles in progress are aborted and any data returned to processor 100 in the clock BOFF# 130 is asserted is ignored. In response to BOFF# 130, processor 100 floats the same pins (or lines) as HOLD (not shown), including LOCK# 136, ADS# 132, but bus hold acknowledge HLDA (not shown) is not asserted. BOFF# 130 overrides BRDY# 134, so if both are sampled active in the same clock, BRDY# 134 is ignored. Processor 100 samples BOFF# pin 130 every clock.

The device that asserts BOFF# 130 (herein, memory controller and PCI bridge 104) to processor 100 is free to run any bus cycle while processor 100 is in the high impedance state. When BOFF# 130 is asserted, the new master (i.e., memory controller and PCI bridge 104) can start its cycle two clocks after issuing BOFF# 130. System processor 100 must wait two clocks after the assertion of BOFF# 130 to begin its cycle to prevent address bus 108 contention.

Bus 112 remains in the high impedance state until BOFF# 130 is negated. At that time, processor 100 restarts all aborted bus cycles from the beginning by driving out the address on address bus 108 and status on control lines 128 and 134 and asserting ADS# 132. Any data returned on bus 106 before BOFF# 130 was asserted is used to continue internal CPU 100 execution, however that data is not placed in an internal cache. Any aborted bus cycles will be restarted from the beginning.

Any hardware external to CPU 100, such as memory controller and PCI bridge 104, or L2 cache 120, is required to assure that if the cycle attribute cache enable KEN# (not shown) was returned to the processor (with first BRDY# 134 or next address NA#, not shown) before the cycle was aborted, it must be returned with the same value after the cycle is restarted. That is, backoff cannot be used to change the cacheability property of the cycle. The writeback/writethrough WB/WT# (not shown) attribute may be changed when the cycle is restarted.

If more than one cycle is outstanding when BOFF# 130 is asserted, processor 100 restarts both outstanding cycles in their original order, and they will not be pipelined unless next address line NA# (not shown) is asserted appropriately.

A pending writeback cycle due to an external snoop hit is reordered in front of any cycles aborted due to BOFF# 130. For example, if a snoop cycle is run concurrently with a line fill, and the snoop hits an M state line and then BOFF# 130 is asserted, the writeback cycle due to the snoop is driven from processor 100 before the cache line fill cycle is restarted.

The system does not rely on the original cycle, that was aborted due to BOFF# 130, from restarting immediately after BOFF# 130 is deasserted. In addition to reordering writebacks due to an external snoop hit in front of cycles that encounter a BOFF# 130, processor 100 may also reorder bus cycles in the following situations:

1. A pending writeback cycle due to an internal snoop hit will be reordered in front of any cycles aborted due to BOFF# 130. If a read cycle is running on bus 112, and an internal snoop of that read cycle hits a modified line in the data cache in CPU 100, and the system asserts BOFF# 130, processor 100 drives out a writeback cycle resulting from the internal snoop hit. After completion of the writeback cycle, processor 100 then restarts the original read cycle. This circumstance can occur during accesses to the page tables and directories in memory 102 and during prefetch cycles, since these accesses cause a bus cycle to be generated before the internal snoop to the on-chip data cache in CPU 100 is performed.

2. If BOFF# 130 is asserted during a L2 data cache 120 replacement writeback cycle, the writeback cycle is aborted and then restarted once BOFF# 130 is deasserted. However, during the BOFF# 130, if processor 100 encounters a request to access the page table or directory in memory 102, this request is reordered in front of the replacement writeback cycle that was aborted due to BOFF# 130. Processor 100 will first run the sequence of bus cycles to service the page table or directory access and then restart the original replacement writeback cycle.

Asserting BOFF# 130 in the same clock as ADS# 132 may cause the processor to leave the ADS# 132 signal floating low. Since ADS# 132 is floating low, a peripheral device may think that a new bus cycle has begun even though the cycle was aborted. To avoid this, the system may not recognize ADS# 132 the clock after ADS# 132 is sampled active, recognize a cycle as ADS# 132 asserted and BOFF# 130 negated in the previous clock, or assert address hold AHOLD (not shown) one clock before asserting BOFF# 130.

Address strobe control line ADS# 132 indicates that a new valid bus 112 cycle is being driven by processor 100. ADS# 132 is used by external bus 112 circuitry as the indication that processor 100 has started a bus 112 cycle. The external system may sample the bus cycle definition pins (such as lines 130–138, inter alia) on the next rising edge of the clock after ADS# 132 is driven active. LOCK# pin, or line, 136 is driven to its valid state in the clock when ADS# 132 is asserted. ADS# 132 floats during bus hold and BOFF# 130, is driven active in the first clock of a bus 112 cycle, and is driven inactive in the second and subsequent clocks of the cycle and also when the bus is idle.

Burst ready control line or pin BRDY# 134 indicates that the external system, including controller 104, has presented valid data on the data pins 106 in response to a read, or that the external system has accepted processor 100 data in response to a write request. Each cycle generated by processor 100 will either be a single transfer read or write, or a burst cache line fill or writeback. For single data transfer cycles, one BRDY# 134 is expected to be returned to processor 100. Once this BRDY# 134 is returned, the cycle is complete. For burst transfers, four data transfers are expected by processor 100, and the cycle is ended when the fourth BRDY# 134 is returned. If BOFF# 130 and BRDY# 134 are asserted simultaneously, BOFF# 130 takes priority and BRDY# 134 is ignored. LOCK# 136 is deasserted after the last BRDY# 134 of the locked sequence.

Burst ready control line BRDYC# 138 is the same as BRDY# 134, except that it is driven to L2 cache 120.

Referring further to FIG. 1, bus lock control line or pin LOCK# 136 protocols, as implemented in the Intel Pentium processor, and as used in the apparatus and method of the present invention, will be described. Bus lock output LOCK# 136 indicates that processor 100 is running a read-modify-write cycle where the external bus 112 must not be relinquished between the read and write cycles. Read-modify-write cycles of this type are used to implement memory 102 based semaphores. Interrupt acknowledge cycles are also locked. If a cycle is split due to a misaligned memory 102 operand, two reads followed by two writes may be locked together. When LOCK# 136 is asserted, the current bus master (for example, controller 104) is allowed exclusive access to system bus 112. The processor will not allow a bus hold when LOCK# 136 is asserted, but address hold AHOLD (not shown) and BOFF# 130 are allowed. LOCK# 136 is floated during bus hold. All locked cycles are driven to external bus 112. If a locked address hits a valid location in one of the internal caches (CPU 100 on-chip cache, not shown), the cache location is invalidated (if the line is in the modified state, it is written back before it is invalidated). LOCK# 136 is guaranteed to be deasserted for at least one clock between back to back locked cycles. As is shown in FIG. 5A, LOCK# 136 goes active with the ADS# 132 of the first locked bus cycle and goes inactive after the BRDY# 134 is returned for the last locked bus cycle.

LOCK# 136 floats when BOFF# 130 is asserted in the middle of a locked cycle, and is driven low again when the cycle is restarted. If BOFF# 130 is asserted during the read cycle of a locked read-modify-write, the locked cycle is redriven from the read when BOFF# 130 is deasserted. If BOFF# 130 is asserted during the write cycle of a locked read-modify-write, only the write cycle is redriven when BOFF# 130 is deasserted. The system is responsible for ensuring that other bus masters do not access the operand being locked if BOFF# 130 is asserted during a LOCKed cycle.

Figure 2:
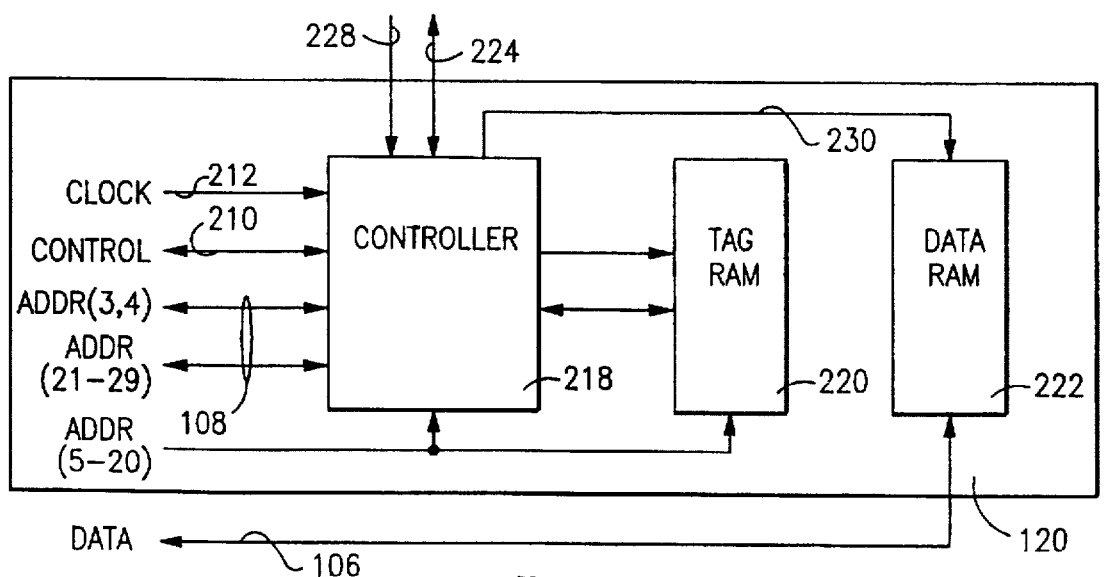
FIG. 2 is a schematic block diagram of the L2 cache of FIG. 1.

Referring now to FIG. 2, L2 cache 120 of FIG. 1 will be described. In this preferred embodiment, L2 cache 120 resides on external or local bus 112 between the L1, or on-chip cache of processor 100, and main memory 102. An L2 cache 120 preferred for this embodiment is described in U. S. patent application Ser. No. 08/357,840 filed 16 Dec. 1994 for Cache Address Modification Control. Insofar as it may be pertinent to this invention, L2 cache 120 includes controller 218, random access memory tag RAM 220, and data RAM 222, which together are mounted to a circuit card which is mounted to the motherboard (not shown) of the computer so as to reside on local bus 112. Data RAM 222 stores data and instructions from CPU 100. Tag RAM 220 stores address and operational state of the data in the storage elements of data RAM 222. Controller 218 uses the information in tag RAM 220 to determine whether the data in the data RAM 222 can be transmitted to CPU 100. Input to L2 cache 120 includes address bus 108, shown in FIG. 2 as including three portions, ADDR (3,4), ADR (21–29) and ADR (5–20), which are fed to controller 218 and tag RAM 220 as shown. Thus, controller 218 addresses the data RAM 222 on line 230 with address bus 108 bits 3 to 20. Address bus 108 bits 5 to 20 select a 32 byte line of data RAM 222, and bits 3 and 4 select the 8 byte word of that line. Controller 218 also addresses tag RAM 220 with bits 5 to 20 of address bus 108. This reads a 12 bit word out of tag RAM 220 which includes the high order address bits 21 to 29 of data stored in RAM 222. Controller 218 determines if there is a match between the stored and requested address bits. If there is a match, bits 0 to 2 of the tag RAM 220 word are tested to determine the status of data stored in data RAM 222. If the address in data RAM 222 is the requested address, status bits 0 to 2 of tag RAM 220 determine the accessibility of that location to a read or write operation by CPU 100. When bit 0 is a "0" the location is read only. When it is a "1" it is writable. When bits 1 and 2 are "1, 1" respectively the data is modified (M) from the copy of the data in memory 102. When they are "0, 1" the data is exclusive (E) and can be modified. When bits 1 and 2 are "1, 0" the data is shared (S) and cannot be modified and when they are "0, 0" the data is invalid. Line 228 is used to set the range of addresses for L2 120 card, and in defining this L2 120 card as a master or slave card. Buddy line 224 is used, inter alia, during flush operations where CPU 100 selects L2 cache 120 to transfer data to memory 102.

Figure 3:
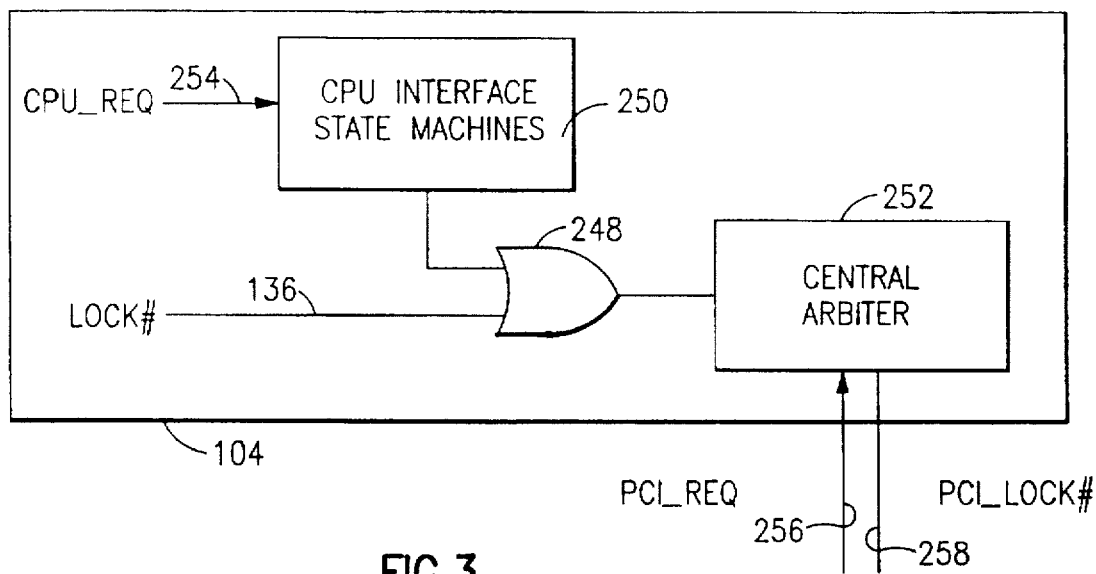
FIG. 3 is a schematic block diagram of the memory controller and peripheral component interconnect (PCI) bridge of FIG. 1.

Referring to FIG. 3, the memory controller and PCI bridge 104 will be described. Controller and bridge 104 enhances system performance by allowing for concurrency between host CPU 100 and PCI bus 110, and contains posted write buffers (not shown) for host 100 to PCI bus 110, host 100 to main memory 102, and PCI bus 110 to main memory 102 transfers. Controller and bridge 104 also contains prefetch buffers (not shown) for host CPU 100 reads of PCI bus 110, and PCI bus 110 reads of main memory 102. Herein, controller and bridge 104 includes CPU interface state machines 250 and central arbiter 252. CPU interface state machines 250 receive and generate signals to CPU 100 and L2 cache 120 to satisfy the required protocols of said devices, as heretofore explained in connection with FIG. 1, control lines 128–138. Additionally, state machines 250 request ownership of memory 102 by assertion of signals to central arbiter 252. If a CPU interface state machines 250 request is granted, state machines 250 request data reads or data writes to memory 102. If arbiter 252 does not grant memory 102 to CPU interface state machines 250, state machines 250 continue to request memory 102 for unlocked bus 112 operations, or asserts BOFF# 130 for locked operations. The protocols implemented by CPU interface state machines 250 will be further explained in connection with the timing diagrams of FIGS. 5B and 6.

Figure 4:
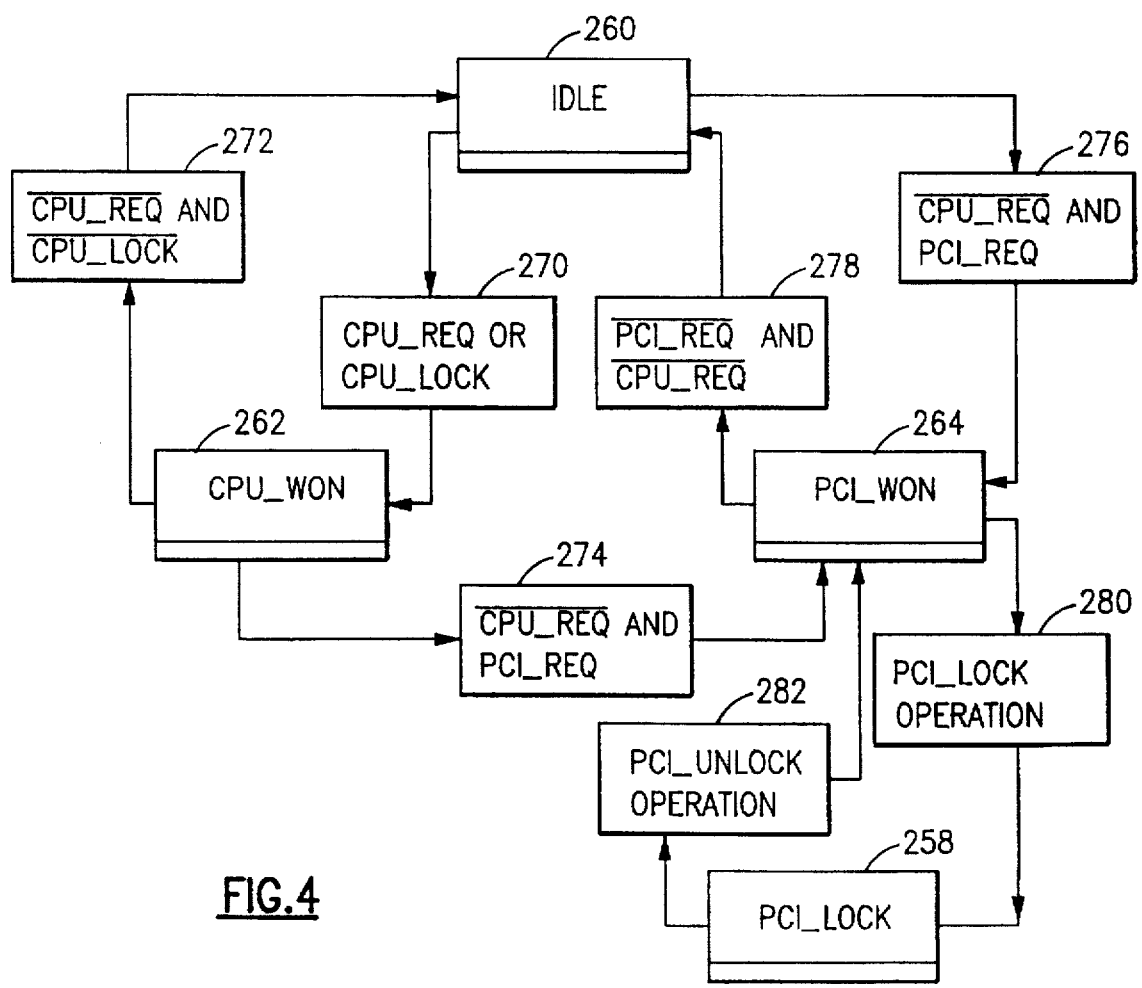
FIG. 4 is a state diagram illustrating the operation of the central arbiter of the memory controller and the PCI bridge of FIG. 1.

Referring to FIG. 4, the state diagram illustrating the operation of central arbiter 252 of FIG. 3 will be described. Arbiter 252 rests in one of four states: idle 260, CPU_WON 262, PCI_WON 264, or PCI_LOCK 258. While in idle state 260, arbiter 252 tests CPU_REQ 254, PCI_REQ 256 and CPU_LOCK 136. Upon detecting in step 270 CPU_REQ 254 valid or CPU_LOCK 136 valid (as is represented also by OR 248 in FIG. 3), arbiter 252 enters the CPU_WON state 262, enabling CPU 100 to access memory 102. Alternatively, while in idle state 260, upon detecting in step 276 CPU_REQ 254 invalid and PCI_REQ 256, arbiter 252 enters PCI_WON state 264, enables PCI_LOCK operation 280, waits to receive PCI_UNLOCK 282, and waits in step 278 for PCI_REQ 278 to go invalid while CPU_REQ is invalid.

Upon entering CPU_WON state 262 from step 270, arbiter 252 waits for CPU_REQ 254 to go invalid and, if CPU_LOCK is invalid returns to idle state 260; otherwise, upon receiving PCI_REQ 256 valid, enters PCI_WON state 264.

While in CPU_WON state 262, arbiter 252 enables transfer of memory 102 data with respect to CPU 100 and L2 cache 120, and when in the PCI_WON state 264, enables transfer of memory 102 data with respect to PCI bus 110.

In this preferred embodiment, memory controller and PCI bridge 104 supports Pentium processor 100 pipelined addressing, CPU 100/PC 110/Memory 102 interfaces via posted write and read prefetch buffers (not shown), and processor 100 internal cache in either write-through or write-back mode; supports cacheable main memory 102, CPU 100 writes posted to memory 102, and refresh cycles; and supports a host/PCI bridge which translates CPU 100 cycles into PCI bus 110 cycles, translates back-to-back sequential CPU 100 memory (not shown) writes into PCI 110 burst cycles, full concurrency between CPU 100 to second level L2 cache 120 and PCI 110 to main memory 102 transactions, and cache snoop filter for ensuring data consistency for PCI 110 to main memory 102 transactions.

CPU 100 accesses data across the CPU local bus 112 to the L2 cache 120 for all read and write cycles which are cached within the L2 cache 120 except for locked write cycles. These locked write cycles must use the state transitions shown in FIG. 4.

Referring now to FIG. 5A, a lock operation as implemented in the prior art is illustrated, showing that inasmuch as N=12, 10 or 8 clocks, latency is 18, 16 or 14 clocks.

Referring to FIG. 5B, the lock operation as implemented in accordance with the present invention improves latency to 9 clocks.

Referring to FIG. 6, the improvement achieved by the present invention is further illustrated, and includes at time 290 a locked read attempted and then aborted by BOFF# 130; at time 292 a locked read successful to L2 cache 120; and at time 294 a locked write successful to main memory 102 and L2 cache 120. The performance gains are 9 cycles, or 50%; 7 cycles, or 40%; and 5 cycles, or 28%, respectively, for processes 290, 292, and 294 with respect to the 18 cycles required by prior art locked operations, FIG. 5A.

With respect to process 290, lines 132, 136 and 128 will float in response to BOFF# 130 until the next ADS# 132, as is represented by the dashed lines, when control of bus 112 cannot be attained on a cache hit read.

In process 292, a cache hit read completes; that is, a locked read is successful to L2 cache 120.

In process 294, a cache hit write-thru completes; that is, a locked write is successful to memory 102 and L2 cache 120.

Referring to FIG. 6 in connection with FIG. 4, BOFF# is asserted at time 2 by state machine 250 for locked operations if arbiter 252 does not grant memory 102 to state machine 250. During locked operations, arbiter 252 will not grant state machine 250 access to memory 102 when the other port 110 of the memory controller and PCI bridge 104 is being accessed by a PCI master device and will, in that event, cause state machine 250 to issue BOFF# 130. If the memory arbiter 252 is able to grant ownership of memory 102 to the state machine 250 and processor 100 for the locked read cycle, such as locked read cycle 292, it is guaranteed to grant memory 102 to processor 100 for the subsequent write cycle 294. Arbiter 252 is able to grant ownership of memory 102 to processor 100 when in CPU_WON state 262, such that data transfer between memory 102 and CPU 100 and L2 cache 120 is enabled—which is the state resulting from decision block 270 CPU_REQ or CPU_LOCK when in idle state 260.

As shown in FIG. 6 in connection with FIG. 4, locked read 292 and locked write 294 do not abort, and issue BOFF# 130. The second attempted locked read 292 was not aborted, because the CPU_LOCK signal is used as a request into the memory arbiter. Even though the first locked read 290 was aborted by BOFF# 130 at time 2, the second locked read 292 (at least for the example of FIG. 6) is able to complete because by time 5 PCI 110 had either completed its operation, as is represented by decision block 278 NOT PCI_REQ and NOT CPU_REQ, or was able to be kicked off.

In accordance with this invention, a mechanism is provided which adheres to the requirements of the CPU local bus 112 providing exclusive access to data by restarting the entire READ/(READ)/Modify/WRITE/(WRITE) access when the PCI local bus 110 has an exclusive access active.

ADVANTAGES OVER THE PRIOR ART

The advantages of the method of the preferred embodiment of this invention include (1) providing access to cache during locked cycles while maintaining lock characteristics, thereby providing cycle time improvement over non-bufferable, non-cachable cycles and simplifying the design of the L2 cache.

ALTERNATIVE EMBODIMENTS

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A system for providing access to cache during locked cycles, comprising:

a central processing unit capable of retrying the whole of an exclusive access sequence;

a cache;

a main memory;

a CPU local bus and a peripheral local bus interconnecting, for the transfer of data, said central processing unit, said cache, a peripheral device, and said main memory; said peripheral local bus supporting with respect to said peripheral device exclusive data access to data interspersed with other data access; and a memory controller interconnecting said CPU local bus, said peripheral local bus, and said main memory for controlling the transfer of data on said CPU local bus, said memory controller being responsive to a locked cycle on said CPU local bus for determining for cache hits if said CPU local bus will continued to be enabled to the locked cycle and, if not, cancelling said locked cycle.

2. The system of claim 1 comprising a peripheral component interconnect (PCI) bus, wherein said memory controller further comprises an arbitration unit selectively enabling transfer of data with respect to said main memory with said CPU local bus or with said peripheral local bus, and locked cycles which are cache hits are passed to the internal arbitration unit of said memory controller.

3. The system of claim 2 for providing access to cache during locked cycles, wherein said internal arbitration unit is responsive to said memory being accessed by said peripheral local bus to cancel said locked cycle.

4. The system of claim 1 for providing access to cache during locked cycles, further comprising:

a first port on said memory controller for interfacing said CPU local bus;

at least one second port on said memory controller for interfacing at least one peripheral local bus;

said memory controller being further operable for cancelling said cycle responsive to a request on said peripheral local bus to access said memory controller during a locked cycle on said CPU local bus.

5. The system of claim 4 for providing access to cache during locked cycles, wherein said memory controller is responsive to a locked read-modify-write operation for selectively granting memory to the locked read cycle and thereafter upon granting memory to said locked read cycle for assuring memory to said write operation.

6. The system of claim 5 wherein said memory controller is operable when both said ports are inactive to define an IDLE state and responsive to a lock request on said first port when in said IDLE state for defining a CPU_WON state; and further responsive to a locked read cycle when not in said CPU_WON state for canceling said read cycle and responsive to a locked read cycle when in said CPU_WON state for granting access to said cache and said memory.

7. The system of claim 1 wherein said memory controller is responsive to an active exclusive access on said peripheral local bus to provide exclusive access to data by said CPU local bus by cancelling and then restarting said locked cycle.

8. A system for providing access to cache during locked cycles, comprising:

a central processing unit capable of retrying the whole of an exclusive access sequence;

a cache;

a main memory;

a CPU local bus and a peripheral local bus interconnecting, for the transfer of data, said central processing unit, said cache, a peripheral device, and said main memory; said peripheral local bus supporting with respect to said peripheral device exclusive data access to data interspersed with other data access; and a memory controller interconnecting said CPU local bus, said peripheral local bus, and said main memory for controlling the transfer of data on said CPU local bus, said memory controller being responsive to a locked cycle on said CPU local bus for allowing access to said cache while maintaining lock characteristics such that said CPU local bus is not relinquished during a read-modify-write cycle.

* * * * *